United States Patent [19]
Payne et al.

[11] Patent Number: 6,047,013
[45] Date of Patent: Apr. 4, 2000

[54] LOW-PHONON-FREQUENCY CHALCOGENIDE CRYSTALLINE HOSTS FOR RARE EARTH LASERS OPERATING BEYOND THREE MICRONS

[75] Inventors: Stephen A. Payne, Castro Valley; Ralph H. Page, San Ramon; Kathleen I. Schaffers, Pleasanton; Michael C. Nostrand, Livermore; William F. Krupke, Pleasanton, all of Calif.; Peter G. Schunemann, Malden, Mass.

[73] Assignee: The Regents of the University of California, Oakland, Calif.

[21] Appl. No.: 09/235,650

[22] Filed: Jan. 22, 1999

[51] Int. Cl.[7] .......................................... H01S 3/16
[52] U.S. Cl. ................... 372/41; 372/39; 372/68
[58] Field of Search .................. 372/39, 41, 68; 252/301.4 R

[56] References Cited

U.S. PATENT DOCUMENTS 3,833,862  9/1974  Wickersheim et al. .......... 252/301.4 R
5,166,948  11/1992  Gavrilovic et al. ..................... 372/41

*Primary Examiner*—Leon Scott, Jr.
*Attorney, Agent, or Firm*—John P. Wooldridge

[57] ABSTRACT

The invention comprises a RE-doped $MA_2X_4$ crystalline gain medium, where M includes a divalent ion such as Mg, Ca, Sr, Ba, Pb, Eu, or Yb; A is selected from trivalent ions including Al, Ga, and In; X is one of the chalcogenide ions S, Se, and Te; and RE represents the trivalent rare earth ions. The $MA_2X_4$ gain medium can be employed in a laser oscillator or a laser amplifier. Possible pump sources include diode lasers, as well as other laser pump sources. The laser wavelengths generated are greater than 3 microns, as becomes possible because of the low phonon frequency of this host medium. The invention may be used to seed optical devices such as optical parametric oscillators and other lasers.

60 Claims, 5 Drawing Sheets

LOW-PHONON-FREQUENCY CHALCOGENIDE CRYSTALLINE HOSTS FOR RARE EARTH LASERS OPERATING BEYOND THREE MICRONS

The United States Government has rights in this invention pursuant to Contract No. W-7405-ENG-48 between the United States Department of Energy and the University of California for the operation of Lawrence Livermore National Laboratory.

BACKGROUND OF THE INVENTION

1. Field of the Invention

The present invention relates to laser systems based on crystals with the chemical formula: RE-doped $MA_2X_4$, where M includes divalent ions such as Mg, Ca, Sr, Ba, Pb, Eu, or Yb; A is selected from trivalent ions including Al, Ga, and In; X can be one of the chalcogenide ions S, Se, and Te; and RE stands for the trivalent rare earth ions. The invention relates particularly to the use of the aforementioned crystals as the gain element in a laser or optical amplifier. The invention relates more particularly to the operation of this laser at a laser wavelength approximately equal to or longer than 3 microns.

2. Description of Related Art

Solid state lasers based on rare earth laser ions that directly provide mid-infrared output at >3 micron wavelengths have previously been developed, although none of these materials are in common use because they do not have compelling performance characteristics. U.S. Pat. No. 5,746,946 by Bowman et al. dated May 5, 1998, disclosed the utility of $Er^{3+}$ as a laser ion that operates from 3–5 microns. Bowman et al. also mention the importance of using a low-phonon-frequency host material in order to obtain efficient mid-infrared emission. U.S. Pat. No. 5,535,232 (Bowman et al., dated Jul. 9, 1996) discloses another mid-infrared laser material, involving the use of $Pr^{3+}$ rare earth ions yielding laser output at 5 and at 7 microns. The present invention calls for the use of sulfide, selenide or telluride crystalline hosts doped with rare earth ions to generate infrared laser light beyond 3 microns. Laser light is commonly generated at less than 3 microns using the oxide and fluoride based crystals that have been employed for many decades, [for example see Caird and Payne, "Crystalline paramagnetic ion lasers," in Handbook of Laser Science and Technology (CRC Press, Boca Raton, 1991), pp. 1–100]. It is worthwhile to mention that a rare earth ion has never previously been reported to lase in a sulfide, selenide, or telluride crystalline host medium.

Rare earth ions have previously been incorporated into various glassy materials (as opposed to crystalline) with the intent of producing laser action. $Dy^{3+}$-doped glassy waveguide lasers have been disclosed in European Patent No. EP 0 756 767 B1 (Samson et al., filed on Apr. 24, 1995) and lasers comprised of Ge—Ga—S glasses doped with rare earth ions are disclosed in U.S. Pat. No. 5,379,149 (Snitzer et al., dated Jan. 3, 1995). Both of these inventions specifically relate to the use of waveguides and glasses. In contrast, the present invention is a specific crystalline composition of matter employed as the gain medium in a laser system.

As noted above, the subject materials of this patent application have the general formula RE-doped $MA_2X_4$ (where M includes divalent ions such as Mg, Ca, Sr, Ba, Pb, Eu, or Yb; A is selected from trivalent ions including Al, Ga, and In; X can be one of the chalcogenide ions S, Se, and Te; and RE stands for the $Ce^{3+}$, $Nd^{3+}$, $Pm^{3+}$, $Sm^{3+}$, $Eu^{3+}$, $Gd^{3+}$, $Tb^{3+}$, $Dy^{3+}$, $Ho^{3+}$, $Tm^{3+}$ and $Yb^{3+}$ trivalent rare earth ions). A number of published papers in the scientific literature contain discussions of the visible luminescence of RE-doped thiogallates, in particular for $CaGa_2S_4$ and $SrGa_2S_4$—for example see Garcia et al., "Photo- and cathodoluminescent properties of erbium-doped thiogallates," J. Electrochem. Soc.: Solid-State Science and Technology 129, 2063–2069 (1982); Peters, et al., "Luminescence and structural properties of thiogallate phosphors $Ce^{3+}$ and $Eu^{2+}$-activated phosphors," J. Electrochem. Soc.: Solid-State Science and Technology 119, 230–236 (1972); Garcia, et al., "Charge transfer excitation of the $Nd^{3+}$, $Sm^{3+}$, $Dy^{3+}$, $Ho^{3+}$, $Er^{3+}$, and $Tm^{3+}$ emission in $CaGa_2S_4$," J. Luminescence 33, 15–27 (1985); Georgobiani, et al., "Photoluminescence of rare earths in $CaGa_2S_4$," Inorganic Materials 31, 16–19 (1995). There are also several patents which disclose the use of these RE-doped thiogallate hosts as candidates for electroluminescent devices: U.S. Pat. No. 5,612,591 (Katayama et al., Mar. 18, 1997) and U.S. Pat. No. 5,747,929 (Kato, et al., May 5, 1998). Of the many papers and patents appearing in the scientific literature, no previous researchers have discussed the option of utilizing the RE-doped $MA_2X_4$ crystals as gain media to generate mid-infrared light. While one versed in the art could be expected to know that RE ions in general serve as laser generators, the special ability of these materials to operate in the mid-infrared range is only evident when their phonon spectra are considered, as discussed below. The fact that these crystals' phonon spectra contain no high-frequency vibrations is crucial, and qualifies them as "low-phonon-frequency hosts."

An important principle of solid-state physics that had been worked out several decades ago involves the impact of the phonon spectrum on the luminescence efficiency, [for example see Weber, "Multiphonon relaxation of rare-earth ions in yttrium orthoaluminate," Phys. Rev. B 8, 54 (1973)]. The basic theory indicates that, in order for materials to emit at long wavelengths, the highest phonon frequencies of the host medium must be less than about 0.20–0.25 times the light frequency. The sulfides, selenides, and tellurides that discussed above have suitably low phonon frequencies to allow for efficient emission beyond 3 microns, while the standard oxide and fluoride crystals are not as suitable for this purpose. For example, the frequency (in wavenumber units) of 5 micron light is 2000 $cm^{-1}$, and 20% of that corresponds to 400 $cm^{-1}$, the approximate maximum phonon vibrational frequency a host material should possess in order to facilitate efficient 5 micron luminescence.

The present invention combines the knowledge that rare earth ions can lase in the mid-infrared with a preferred host medium (having high optical quality and low phonon frequency).

SUMMARY OF THE INVENTION

Accordingly, it is an object of the invention to provide rare-earth-doped crystals that lase in the mid-infrared (>3 microns) and have the $MA_2X_4$ chemical formula.

It is another object of the invention to dope said laser crystals with trivalent rare earth ions.

It is a further object of the invention to provide pump sources with which to energize said laser crystals, including laser diodes.

It is an additional object of the invention to Q-switch, mode-lock, or wavelength-narrow the output of said lasers.

It is a another object of the invention to employ such lasers as seed sources for optical parametric oscillators and other lasers.

The invention comprises a RE-doped $MA_2X_4$ crystalline gain medium, where M includes a divalent ion such as Mg, Ca, Sr, Ba, Pb, Eu, or Yb; A is selected from trivalent ions including Al, Ga, and In; X can be one of the chalcogenide ions S, Se, and Te; and RE represents the trivalent rare earth ions. The $MA_2X_4$ gain medium can be employed in a laser oscillator or a laser amplifier. Possible pump sources include the diode lasers, as well as other laser pump sources. The laser wavelengths generated are greater than 3 microns, as becomes possible because of the low phonon frequency of this host medium. The invention may be used to seed optical devices such as optical parametric oscillators and other lasers.

DETAILED DESCRIPTION OF THE INVENTION

Figure 1:
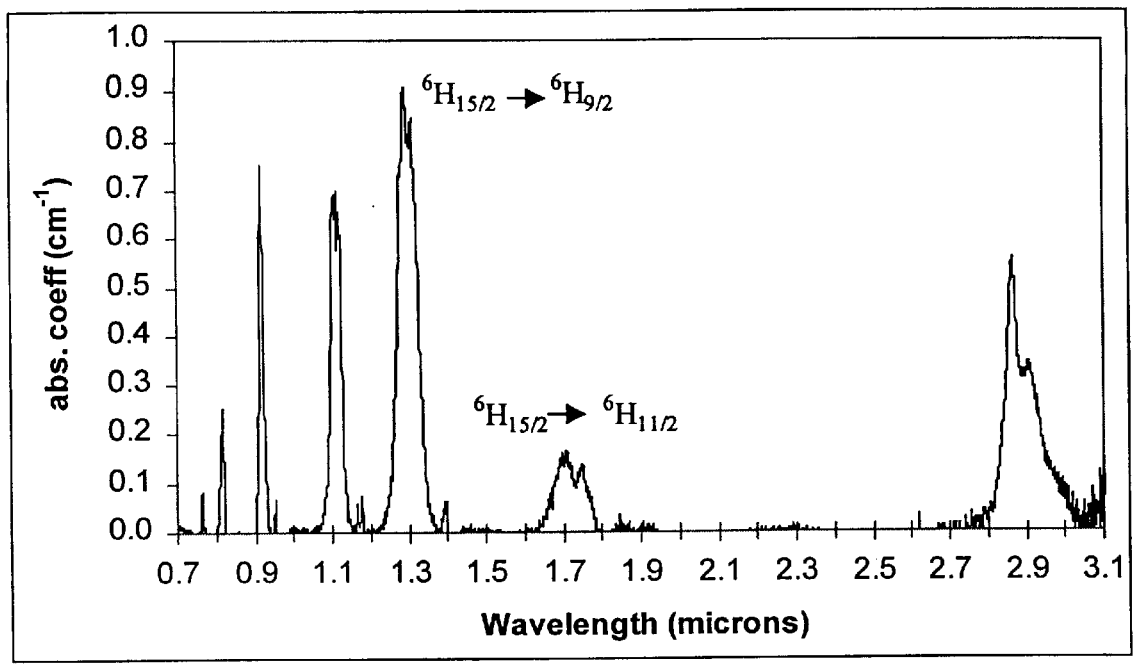
FIG. 1A shows the absorption spectra of $Dy^{3+}$ in $CaGa_2S_4$ at room temperature. Light tuned to the wavelengths of the absorption features can be used to pump the laser ion to the designated electronic energy levels.
FIG. 1B shows the emission spectra of $Dy^{3+}$ in $CaGa_2S_4$ at room temperature.
Figure 1:
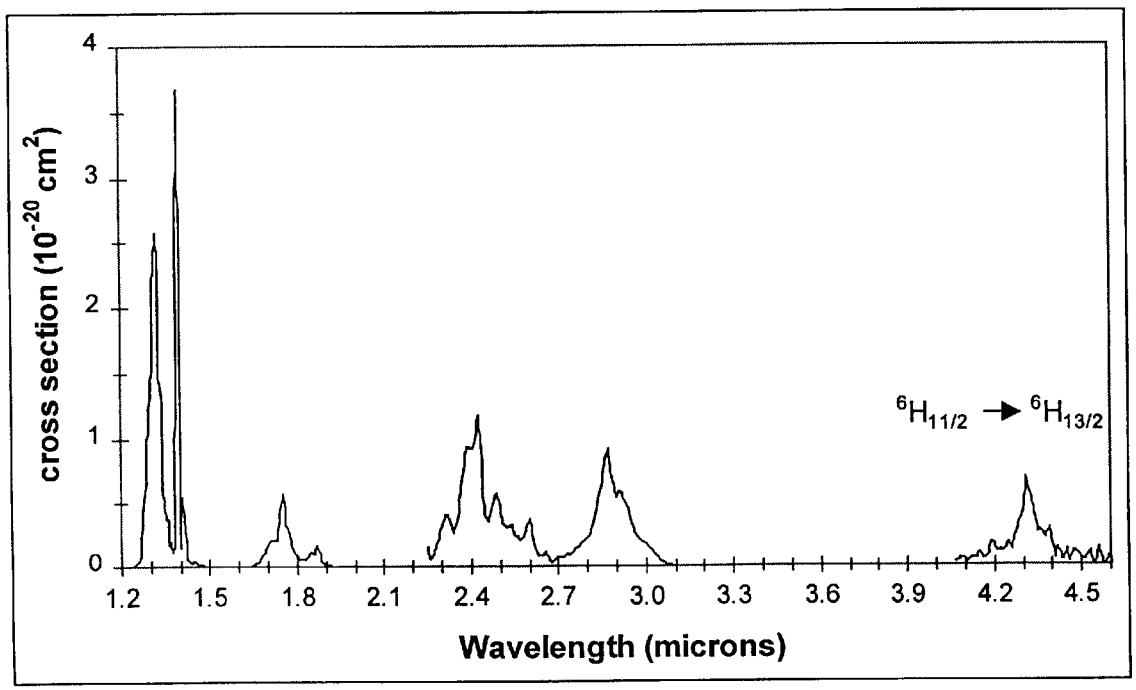

The laser performance of a crystal such as $Dy^{3+}$ in $CaGa_2S_4$ can be partly evaluated by considering the absorption and emission spectra, as pictured in FIGS. 1A and 1B. The absorption (FIG. 1A) indicates the wavelengths at which dysprosium may be pumped, and the emission (FIG. 1B) suggests the possible wavelengths where the material can lase.

Figure 2:
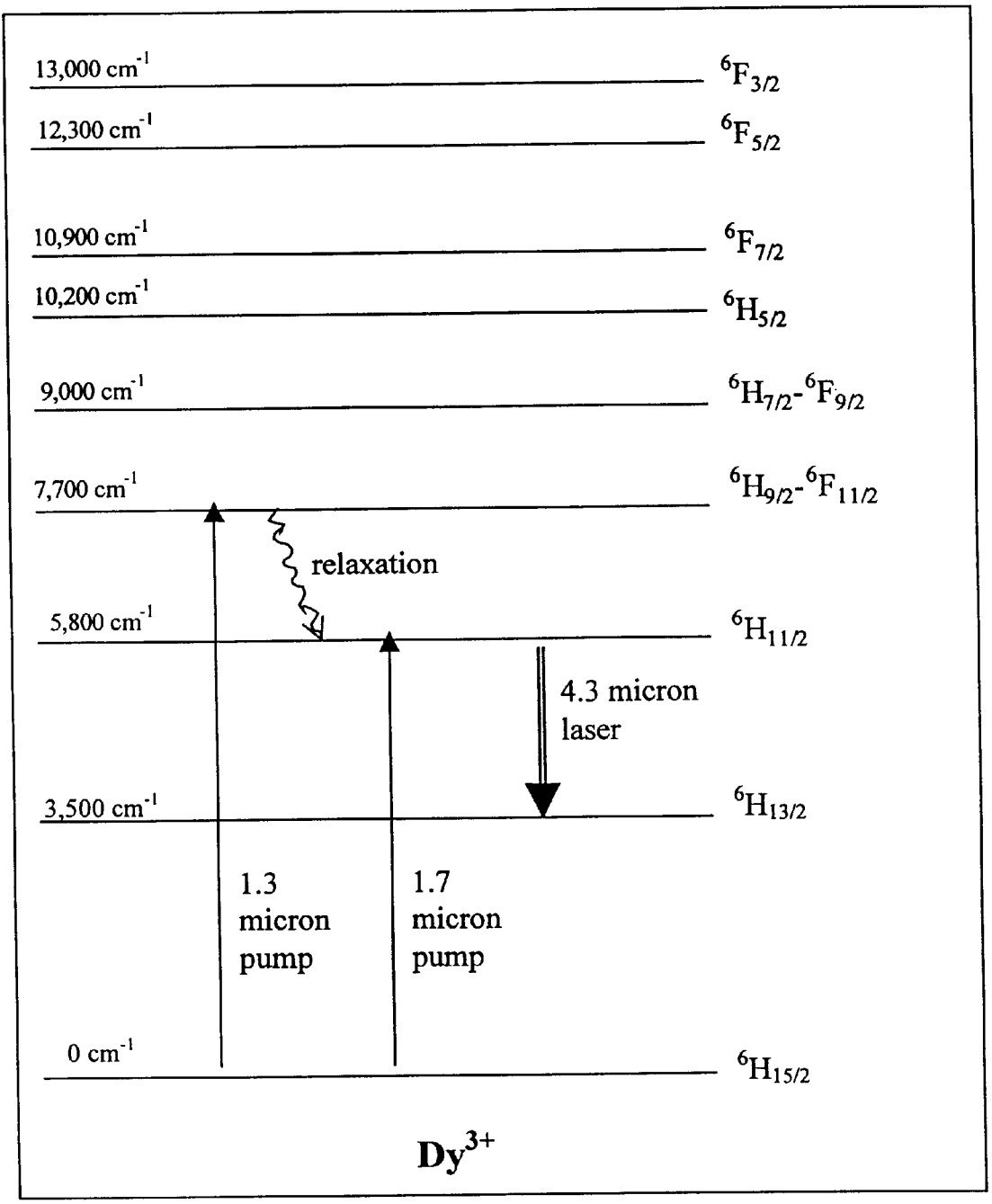
FIG. 2 displays the relevant energy levels of $Dy^{3+}$ in a generic host medium. The 4.3 micron laser transition involves the $^6H_{11/2}$ to $^6H_{13/2}$ transition. It can be pumped at 1.7 microns or at 1.3 microns. (Energy supplied by 1.3 micron pumping of the $^6H_{9/2}$ level relaxes substantially to the $^6H_{11/2}$ upper laser level of the 4.3 micron transition).
Figure 3:
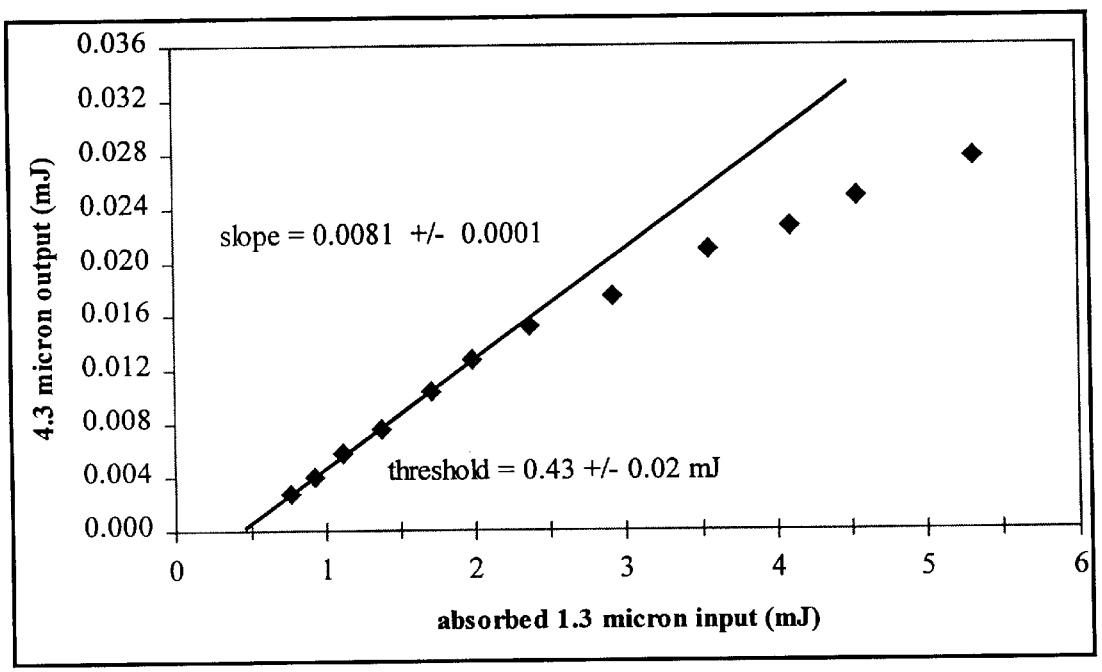
FIG. 3 shows the output energy of $Dy^{3+}$ in a $CaGa_2S_4$ laser oscillator as a function of the energy delivered by the pump beam, for the case of laser action at 4.3 microns.

The relevant energy levels of $Dy^{3+}$ are pictured in FIG. 2, and by comparing FIGS. 1A and 1B with FIG. 2, it is possible to match the laser transitions and the pump transitions. One scheme able to achieve 4.3 micron laser action involves pumping the $^6H_{15/2}-^6H_{9/2}$ transition with a standard 1.3 micron Nd:YAG laser, allowing the energy to relax to the $^6H_{11/2}$ upper laser level, operating the laser on the 4.3 micron $^6H_{11/2}-^6H_{13/2}$ electronic transition, and finally allowing the ion to relax back to the $^6H_{15/2}$ ground state. The experimental data based on this operational scheme is pictured in FIG. 3, proving that the present invention for achieving >3 micron laser action based on RE-doped sulfide, selenide, and telluride crystals is viable.

Figure 4:
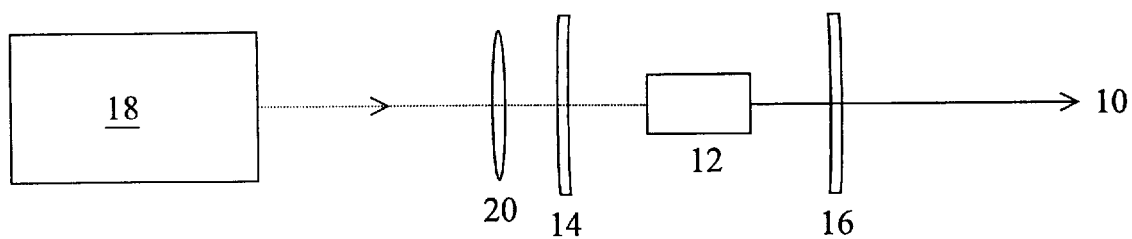
FIG. 4 is a schematic diagram of solid state laser architectures based on the $Dy^{3+}:CaGa_2S_4$ gain medium.

Two embodiments of the laser as an oscillator and amplifier configuration are sketched in FIG. 4. The main components of the laser 10 include the laser crystal 12, the two mirrors 14 and 16 (comprising the cavity and which can be eliminated for amplifier configurations), and the pump source 18, used to energize the laser crystal 12. As shown, the crystal 12 is end pumped by source 18 through mirror 14, i.e. along the laser axis, but other pump geometries, e.g. side pumped, can also be used. Examples of pump sources include the 1.3 micron output of a Nd:YAG laser as noted above, as well as laser diode stripes and arrays. In addition to direct generation of laser light, the availability of an efficient, robust, mid-infrared laser permits the use of this system to seed subsequent laser components, such as optical parametric generators, amplifiers, and oscillators. The mid-infrared laser crystals can also be configured to operate in pulsed modes (e.g. Q-switched and mode-locked) on the basis of commonly employed techniques.

Figure 5:
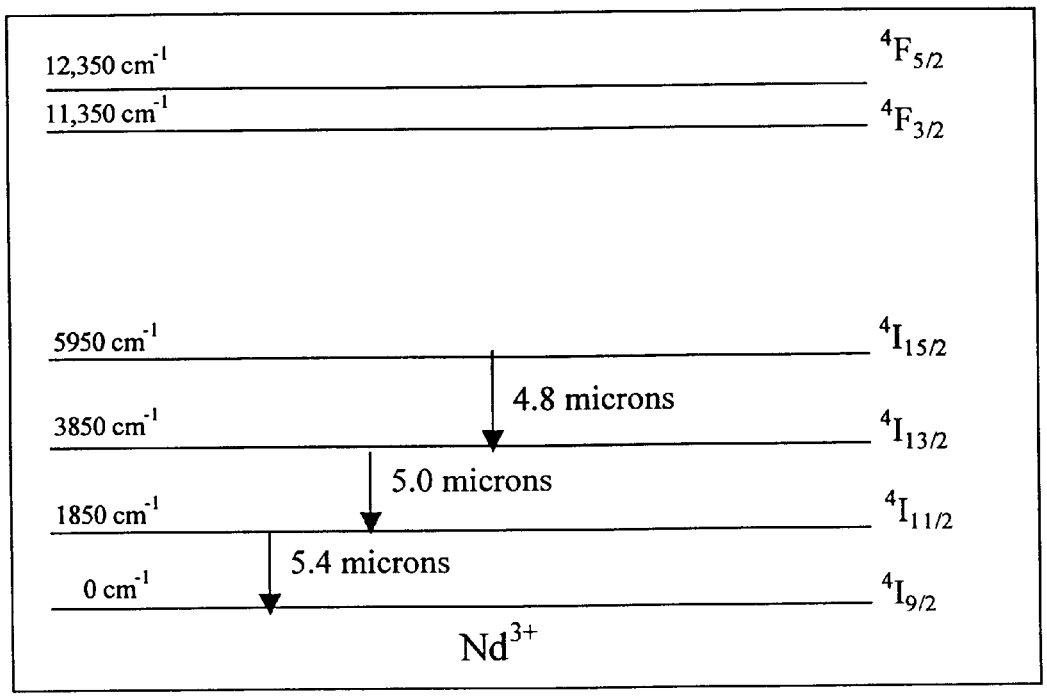
FIG. 5 displays the relevant energy levels of other rare earth ions that may offer laser action in the mid-infrared, including $Nd^{3+}$ and $Tb^{3+}$. The laser transitions for these ions are $^4I_{11/2}-^4I_{9/2}$ and $^7F_4-^7F_5$, respectively.
Figure 5:
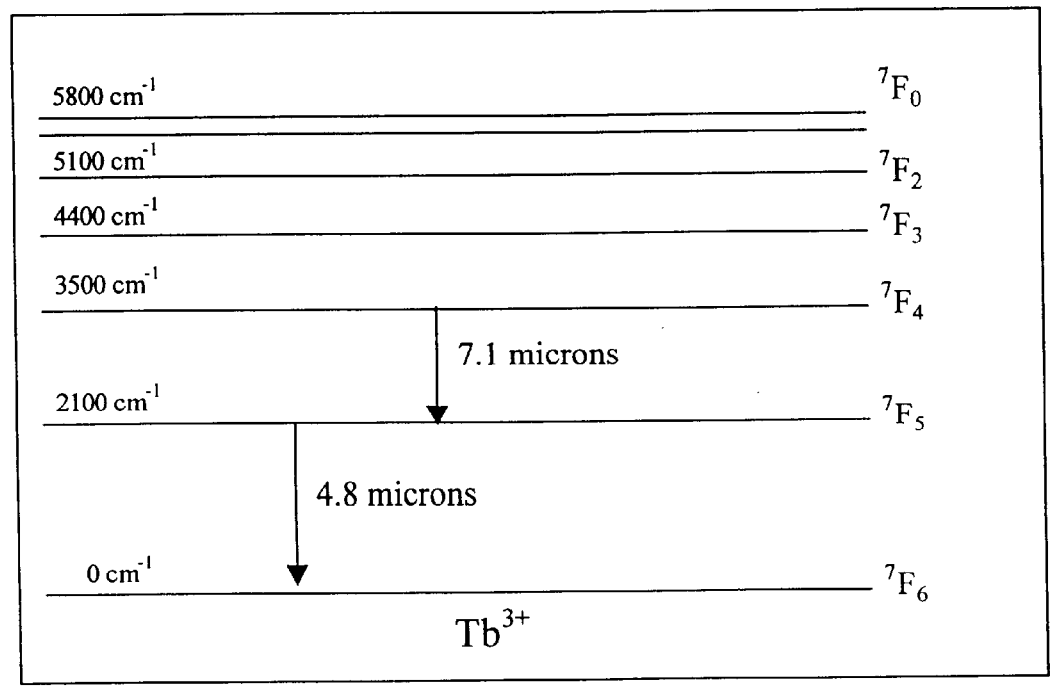

FIG. 5 contains the energy level diagrams of $Nd^{3+}$ and $Tb^{3+}$, which reveal that the $^4I_{11/2}-^4I_{9/2}$ and the $^7F_4-^7F_5$ transitions are able to generate laser light in the mid-infrared at 5 and 7 microns, respectively. The $Tb^{3+}$ ion can be pumped near 1.8 $\mu$m, from which the energy will rapidly relax to the $^7F_4$ upper laser level. The excited state absorption loss is predicted to be low, so this material should lase at 7 $\mu$m in the $MA_2X_4$ host materials (since the nonradiative decay rate should be minimal). The $Nd^{3+}:MA_2X_4$ laser may require energy transfer from an additional ion, referred to as a sensitizer, in order to be pumped effectively. One reduction to practice of this approach entails the codoping of $Pr^{3+}$ into this same host material (i.e. $Pr^{3+},Nd^{3+}:MA_2X_4$) with the anticipation that following pumping of $Pr^{3+}$ at 1.9 $\mu$m, the energy will be transferred to the $Nd^{3+}$ laser ions. Similarly, $Ce^{3+}:MA_2X_4$ can lase at 5 $\mu$m, and can also be pumped by way of energy transfer from $Pr^{3+}$. Another embodiment of a long wavelength laser is $Sm^{3+}:MA_2X_4$, which can be pumped via the $^6H_{5/2}-^6H_{13/2}$ transition at 2.0 $\mu$m, followed by laser action near 7.3 $\mu$m. These examples of laser ions ($Ce^{3+}$, $Nd^{3+}$, $Tb^{3+}$, $Sm^{3+}$) are intended to be suggestive of how appropriate consideration of energy levels, transition strengths, and nonradiative decay rates can be combined to deduce many lasing schemes among the rare earth doped $MA_2X_4$-type compounds. Furthermore, as noted above, $Er^{3+}$ has been previously considered at a 5 $\mu$m laser and $Pr^{3+}$ as a 7 $\mu$m laser, (as dopants in chloride crystals). $Dy^{3+}:CaGa_2S_4$ material has been demonstrated by the inventors to lase at 4.3 $\mu$m. In fact, all of the trivalent rare earth ions offer the prospect of laser action beyond 3 $\mu$m through incorporation in $MA_2X_4$ crystals, by appropriate choice of pump and laser wavelengths.

Accordingly, one embodiment of the invention includes laser system having a laser crystal with an RE-doped $MA_2X_4$ crystalline gain medium, where M is a divalent ion; A is a trivalent ion; X is a chalcogenide ion; and RE is a trivalent rare earth ion. The laser systems may be pumped by a variety of pump sources including a laser diode. The system is configured to emit laser light at about 3 microns or greater. The divalent ion M may consists of Mg, Ca, Sr, Ba, Pb, Eu or Yb. The trivalent ion A may consist of Al, Ga and In. The chalcogenide ion X is may consist of S, Se and Te. The trivalent ion RE may be $Ce^{3+}$, $Nd^{3+}$, $Pm^{3+}$, $Sm^{3+}$, $Eu^{3+}$, $Gd^{3+}$, $Tb^{3+}$, $Dy^{3+}$, $Ho^{3+}$, $Tm^{3+}$ or $Yb^{3+}$.

Another embodiment of the invention includes a laser crystal having an RE-doped $MA_2X_4$ crystalline gain medium, where M is divalent ions combined with roughly equal portions of monovalent and trivalent ions. Alternately, M is roughly equal portions of monovalent and trivalent ions; A is a trivalent ion; X is a chalcogenide ion and RE is a trivalent rare earth ion. A laser diode may be used as pump source to energize the laser crystal. The laser system is configured to emit laser light at about 3 microns or greater. The monovalent ions are $Li^+$, $Na^+$, $K^+$, $Rb^+$, or $Cs^+$. Trivalent ions usable in this embodiment are selected from the rare earths and $Y^{3+}$. A is selected from Al, Ga and In. X is selected from S, Se and Te. RE is selected from $Ce^{3+}$, $Nd^{3+}$, $Pm^{3+}$, $Sm^{3+}$, $Eu^{3+}$, $Gd^{3+}$, $Tb^{3+}$, $Dy^{3+}$, $Ho^{3+}$, $Tm^{3+}$ and $Yb^{3+}$.

An embodiment of the laser system includes a laser crystal having an $Dy^{3+}$-doped $MA_2X_4$ crystalline gain medium, where M is a divalent ion; A is a trivalent ion; X is a chalcogenide ion; and RE is a trivalent rare earth ion. A pumping source usable in this embodiment includes a laser diode and an Nd:YAG laser operating at 1.3 microns. M is selected from Mg, Ca, Sr, Ba, Pb, Eu and Yb. A is selected from Al, Ga and In. X is selected from S, Se and Te. In one embodiment, the laser system is configured to emit laser light at about 3 microns or greater, and in another embodiment, the laser system is configured to emit laser light at about 4.3 microns.

An embodiment may include a laser crystal having an $Dy^{3+}$-doped $MA_2X_4$ crystalline gain medium, wherein M is selected from a first group consisting of divalent ions combined with roughly equal portions of monovalent and trivalent ions and a second group consisting of roughly equal portions of monovalent and trivalent ions; A is a trivalent ion; X is a chalcogenide ion; and RE is a trivalent rare earth ion. A pump source to energize said laser crystal may be either a laser diode or an Nd:YAG laser operating at 1.3 microns. Other pump sources may be used. The monovalent ions are selected from $Li^+$, $Na^+$, $K^+$, $Rb^+$, and $Cs^+$. The trivalent ions are selected from the rare earths and $Y^{3+}$. A is selected from Al, Ga and In. X is selected from S, Se and Te. The laser system may be configured to emit laser light at about 3 microns or greater, or alternately, may be configured to emit laser light at about 4.3 microns.

Another laser system within the scope of this invention has a laser crystal selected from $Dy^{3+}$-doped $CaGa_2S_4$, $SrGa_2S_4$, $BaGa_2S_4$, $CaGa_2Se_4$, $SrGa_2Se_4$, or $BaGa_2Se_4$, and includes an Nd:YAG laser operating at 1.3 microns or a laser diode pump source to energize the laser crystal.

Still another embodiment includes a laser system having a laser crystal with an $Er^{3+}$-doped $MA_2X_4$ crystalline gain medium, where M is a divalent ion; A is a trivalent ion; X is a chalcogenide; and RE is a trivalent rare earth ion. This embodiment includes a laser diode pump source to energize the laser crystal. M is selected from Mg, Ca, Sr, Ba, Pb, Eu and Yb. A is selected from Al, Ga and In. X is selected from S, Se and Te. The laser system may be configured to emit laser light at about 3 microns or greater. The laser crystal has a phonon frequency of >350 $cm^{-1}$.

According to another embodiment of the present invention, a laser system includes a laser crystal having an $Er^{3+}$-doped $MA_2X_4$ crystalline gain medium, where M is selected from a first group consisting of divalent ions combined with roughly equal portions of monovalent and trivalent ions and a second group consisting of roughly equal portions of monovalent and trivalent ions; A is a trivalent ion; X is a chalcogenide ion; and RE is a trivalent rare earth ion. A pump source to energize the laser crystal pump source is selected from a laser diode and an Nd:YAG laser operating at 1.3 microns. The monovalent ions are selected from $Li^+$, $Na^+$, $K^+$, $Rb^+$, and $Cs^+$. The trivalent ions are selected from among the rare earths and $Y^{3+}$. A is selected from Al, Ga and In. X is selected from S, Se and Te. The laser system may be configured to emit laser light at about 3 microns or greater. The laser crystal may have a phonon frequency of >350 $cm^{-1}$.

Another embodiment of the present invention includes a laser system having a laser crystal with an $Pr^{3+}$-doped $MA_2X_4$ crystalline gain medium, where M is a divalent ion; A is a trivalent ion; X is a chalcogenide ion selected from a group consisting of S, Se and Te; and RE is a trivalent rare earth ion. A laser diode is used as a pump source to energize said laser crystal. M is selected from Mg, Ca, Sr, Ba, Pb, Eu and Yb. A is selected from Al, Ga and In. X is selected from S, Se and Te. The laser system may be configured to emit laser light at about 3 microns or greater. The laser crystal may have a phonon frequency of >350 $cm^{-1}$.

Still another embodiment of the present invention is a laser system having a laser crystal with an $Er^{3+}$-doped $MA_2X_4$ crystalline gain medium, where M is selected from a first group consisting of divalent ions combined with roughly equal portions of monovalent and trivalent ions and a second group consisting of roughly equal portions of monovalent and trivalent ions; A is a trivalent ion; X is a chalcogenide ion selected from a group consisting of S, Se and Te; and RE is a trivalent rare earth ion. The pump source is selected from laser diode and an Nd:YAG laser operating at 1.3 microns. The monovalent ions are selected from $Li^+$, $Na^+$, $K^+$, $Rb^+$, and $Cs^+$. The trivalent ions are selected from among the rare earths and $Y^{3+}$. A is selected from Al, Ga and In. X is selected from S, Se and Te. The laser system may be configured to emit laser light at about 3 microns or greater. The laser crystal may have a phonon frequency of >350 $cm^{-1}$.

Changes and modifications in the specifically described embodiments can be carried out without departing from the scope of the invention which is intended to be limited only by the scope of the appended claims.

The invention claimed is:

1. A laser system, comprising:
   a laser crystal having an RE-doped $MA_2X_4$ crystalline gain medium, where M is a divalent ion; A is a trivalent ion; X is a chalcogenide ion; and RE is a trivalent rare earth ion; and
   a pump source to energize said laser crystal,
   wherein said laser system is configured to emit laser light at about 3 microns or greater.

2. The laser system of claim 1, wherein M is selected from a group consisting of Mg, Ca, Sr, Ba, Pb, Eu and Yb.

3. The laser system of claim 1, wherein A is selected from a group consisting of Al, Ga and In.

4. The laser system of claim 1, wherein X is selected from a group consisting of S, Se and Te.

5. The laser system of claim 1, wherein RE is selected from a group consisting of $Ce^{3+}$, $Nd^{3+}$, $Pm^{3+}$, $Sm^3$, $Eu^{3+}$, $Gd^{3+}$, $Tb^{3+}$, $Dy^{3+}$, $Ho^{3+}$, $Tm^{3+}$ and $Yb^{3+}$.

6. The laser system of claim 1, wherein said pump source comprises a laser diode.

7. A laser system, comprising:
   a laser crystal having an RE-doped $MA_2X_4$ crystalline gain medium, wherein M is selected from a first group consisting of divalent ions combined with roughly equal portions of monovalent and trivalent ions and a second group consisting of roughly equal portions of monovalent and trivalent ions; A is a trivalent ion; X is a chalcogenide ion; and RE is a trivalent rare earth ion; and
   a pump source to energize said laser crystal,
   wherein said laser system is configured to emit laser light at about 3 microns or greater.

8. The laser system of claim 7, wherein said monovalent ions are selected from a group consisting of $Li^+$, $Na^+$, $K^+$, $Rb^+$, and $Cs^+$.

9. The laser system of claim 7, wherein said trivalent ions are selected from a group consisting of the rare earths and $Y^{3+}$.

10. The laser system of claim 7, wherein A is selected from a group consisting of Al, Ga and In.

11. The laser system of claim 7, wherein X is selected from a group consisting of S, Se and Te.

12. The laser system of claim 7, wherein RE is selected from a group consisting of $Ce^{3+}$, $Nd^{3+}$, $Pm^{3+}$, $Sm^{3+}$, $Eu^{3+}$, $Gd^{3+}$, $Tb^{3+}$, $Dy^{3+}$, $Ho^{3+}$, $Tm^{3+}$ and $Yb^{3+}$.

13. The laser system of claim 7, wherein said pump source comprises a laser diode.

14. A laser system, comprising:
   a laser crystal having an $Dy^{3+}$-doped $MA_2X_4$ crystalline gain medium, where M is a divalent ion; A is a trivalent ion; X is a chalcogenide ion; and RE is a trivalent rare earth ion; and
   a pump source to energize said laser crystal.

15. The laser system of claim 14, wherein M is selected from a group consisting of Mg, Ca, Sr, Ba, Pb, Eu and Yb.

16. The laser system of claim 14, wherein A is selected from a group consisting of Al, Ga and In.

17. The laser system of claim 14, wherein X is selected from a group consisting of S, Se and Te.

18. The laser system of claim 14, wherein said pump source is selected from a group consisting of a laser diode and an Nd:YAG laser operating at 1.3 microns.

19. The laser system of claim 14, wherein said laser system is configured to emit laser light at about 3 microns or greater.

20. The laser system of claim 14, wherein said laser system is configured to emit laser light at about 4.3 microns.

21. A laser system, comprising:
   a laser crystal having an $Dy^{3+}$-doped $MA_2X_4$ crystalline gain medium, wherein M is selected from a first group consisting of divalent ions combined with roughly equal portions of monovalent and trivalent ions and a second group consisting of roughly equal portions of monovalent and trivalent ions; A is a trivalent ion; X is a chalcogenide ion; and RE is a trivalent rare earth ion; and
   a pump source to energize said laser crystal.

22. The laser system of claim 21, wherein said monovalent ions are selected from a group consisting of $Li^+$, $Na^+$, $K^+$, $Rb^+$, and $Cs^+$.

23. The laser system of claim 21, wherein said trivalent ions are selected from a group consisting of the rare earths and $Y^{3+}$.

24. The laser system of claim 21, wherein A is selected from a group consisting of Al, Ga and In.

25. The laser system of claim 21, wherein X is selected from a group consisting of S, Se and Te.

26. The laser system of claim 21, wherein said pump source is selected from a group consisting of a laser diode and an Nd:YAG laser operating at 1.3 microns.

27. The laser system of claim 21, wherein said laser system is configured to emit laser light at about 3 microns or greater.

28. The laser system of claim 21, wherein said laser system is configured to emit laser light at about 4.3 microns.

29. A laser system, comprising:
   a laser crystal selected from a group consisting $Dy^{3+}$-doped $CaGa_2S_4$, $SrGa_2S_4$, $BaGa_2S_4$, $CaGa_2Se_4$, $SrGa_2Se_4$, and $BaGa_2Se_4$; and
   a pump source to energize said crystal.

30. The laser system of claim 29, wherein said pump source is selected from a group consisting of an Nd:YAG laser operating at 1.3 microns and a laser diode.

31. A laser system, comprising:
   a laser crystal having an $Er^{3+}$-doped $MA_2X_4$ crystalline gain medium, where M is a divalent ion; A is a trivalent ion; X is a chalcogenide ion; and RE is a trivalent rare earth ion; and
   a pump source to energize said laser crystal.

32. The laser system of claim 31, wherein M is selected from a group consisting of Mg, Ca, Sr, Ba, Pb, Eu and Yb.

33. The laser system of claim 31, wherein A is selected from a group consisting of Al, Ga and In.

34. The laser system of claim 31, wherein X is selected from a group consisting of S, Se and Te.

35. The laser system of claim 31, wherein said pump source comprises a laser diode.

36. The laser system of claim 31, wherein said laser system is configured to emit laser light at about 3 microns or greater.

37. The laser system of claim 31, wherein said laser crystal has a phonon frequency of >350 $cm^{-1}$.

38. A laser system, comprising:
   a laser crystal having an $Er^{3+}$-doped $MA_2X_4$ crystalline gain medium, wherein M is selected from a first group consisting of divalent ions combined with roughly equal portions of monovalent and trivalent ions and a second group consisting of roughly equal portions of monovalent and trivalent ions; A is a trivalent ion; X is a chalcogenide ion; and RE is a trivalent rare earth ion; and
   a pump source to energize said laser crystal.

39. The laser system of claim 38, wherein said monovalent ions are selected from a group consisting of $Li^+$, $Na^+$, $K^+$, $Rb^+$, and $Cs^+$.

40. The laser system of claim 38, wherein said trivalent ions are selected from a group consisting of the rare earths and $Y^{3+}$.

41. The laser system of claim 38, wherein A is selected from a group consisting of Al, Ga and In.

42. The laser system of claim 38, wherein X is selected from a group consisting of S, Se and Te.

43. The laser system of claim 38, wherein said pump source is selected from a group consisting of a laser diode and an Nd:YAG laser operating at 1.3 microns.

44. The laser system of claim 38, wherein said laser system is configured to emit laser light at about 3 microns or greater.

45. The laser system of claim 38, wherein said laser crystal has a phonon frequency of >350 $cm^{-1}$.

46. A laser system, comprising:
   a laser crystal having an $Pr^{3+}$-doped $MA_2X_4$ crystalline gain medium, where M is a divalent ion; A is a trivalent ion; X is a chalcogenide ion; and RE is a trivalent rare earth ion; and
   a pump source to energize said laser crystal.

47. The laser system of claim 46, wherein M is selected from a group consisting of Mg, Ca, Sr, Ba, Pb, Eu and Yb.

48. The laser system of claim 46, wherein A is selected from a group consisting of Al, Ga and In.

49. The laser system of claim 46, wherein X is selected from a group consisting of S, Se and Te.

50. The laser system of claim 46, wherein said pump source comprises a laser diode.

51. The laser system of claim 46, wherein said laser system is configured to emit laser light at about 3 microns or greater.

52. The laser system of claim 46, wherein said laser crystal has a phonon frequency of >350 $cm^{-1}$.

53. A laser system, comprising:

a laser crystal having an $Er^{3+}$-doped $MA_2X_4$ crystalline gain medium, wherein M is selected from a first group consisting of divalent ions combined with roughly equal portions of monovalent and trivalent ions and a second group consisting of roughly equal portions of monovalent and trivalent ions; A is a trivalent ion; X is a chalcogenide ion; and RE is a trivalent rare earth ion; and a pump source to energize said laser crystal.

54. The laser system of claim 53, wherein said monovalent ions are selected from a group consisting of $Li^+$, $Na^+$, $K^+$, $Rb^+$, and $Cs^+$.

55. The laser system of claim 53, wherein said trivalent ions are selected from a group consisting of the rare earths and $Y^{3+}$.

56. The laser system of claim 53, wherein A is selected from a group consisting of Al, Ga and In.

57. The laser system of claim 53, wherein X is selected from a group consisting of S, Se and Te.

58. The laser system of claim 53, wherein said pump source is selected from a group consisting of a laser diode and an Nd:YAG laser operating at 1.3 microns.

59. The laser system of claim 53, wherein said laser system is configured to emit laser light at about 3 microns or greater.

60. The laser system of claim 53, wherein said laser crystal has a phonon frequency of $>350$ $cm^{-1}$.

* * * * *